United States Patent [19]

Weiler

[11] 4,099,727
[45] Jul. 11, 1978

[54] SEAL SYSTEM FOR A GAS TURBINE ENGINE OR THE LIKE

[75] Inventor: Wolfgang Weiler, Dachau, Germany

[73] Assignee: Motoren-und Turbinen-Union Munchen GmbH, Germany

[21] Appl. No.: 803,383

[22] Filed: Jun. 3, 1977

[30] Foreign Application Priority Data

Jun. 5, 1976 [DE] Fed. Rep. of Germany ....... 2625551

[51] Int. Cl.² ............................................. F16J 15/40
[52] U.S. Cl. .................................... 277/3; 308/187.1;
415/112; 277/53; 277/59
[58] Field of Search ...................... 277/53–57,
277/15, 59, 66, 71, 72 R, 72 FM, 75, 3;
415/111–113; 308/187.1, 187.2

[56] References Cited

U.S. PATENT DOCUMENTS

| 1,872,251 | 8/1932 | Cowin | 308/187.1 |
| 2,640,319 | 6/1953 | Wislicenus | 415/143 |
| 2,941,852 | 6/1960 | Fuller | 308/187.1 |
| 3,351,396 | 11/1967 | Dechslin | 277/54 X |
| 3,537,713 | 11/1970 | Matthews et al. | 415/174 X |

FOREIGN PATENT DOCUMENTS

| 573,542 | 4/1933 | Fed. Rep. of Germany | 415/111 |
| 975,981 | 1/1963 | Fed. Rep. of Germany | 277/57 |
| 227,536 | 1/1925 | United Kingdom | 277/55 |
| 780,537 | 8/1957 | United Kingdom | 277/15 |

Primary Examiner—Robert S. Ward, Jr.
Attorney, Agent, or Firm—Craig & Antonelli

[57] ABSTRACT

A dual labyrinth seal arrangement is provided for controlling the supply of sealing air to a bearing chamber of a gas turbine engine. The bearing chamber housing the bearing for a turbomachine shaft connecting a compressor stage with a gas generator turbine is surrounded by a second chamber. A first of the labyrinth seals is disposed between the shaft and the second chamber so as to reduce the pressure of a supply of high pressure sealing medium passing into the seal chamber. The second set of labyrinth seals are provided between the turbo shaft and the second chamber so as to reduce the pressure of sealing medium passing from the second chamber into the bearing chamber. In particularly preferred embodiments, a majority of the sealing medium is vented from the second chamber and supplied to the working cycle of the gas turbine engine, while the remaining smaller portion is supplied as sealing air into the bearing chamber via the second set of labyrinth seals.

10 Claims, 1 Drawing Figure

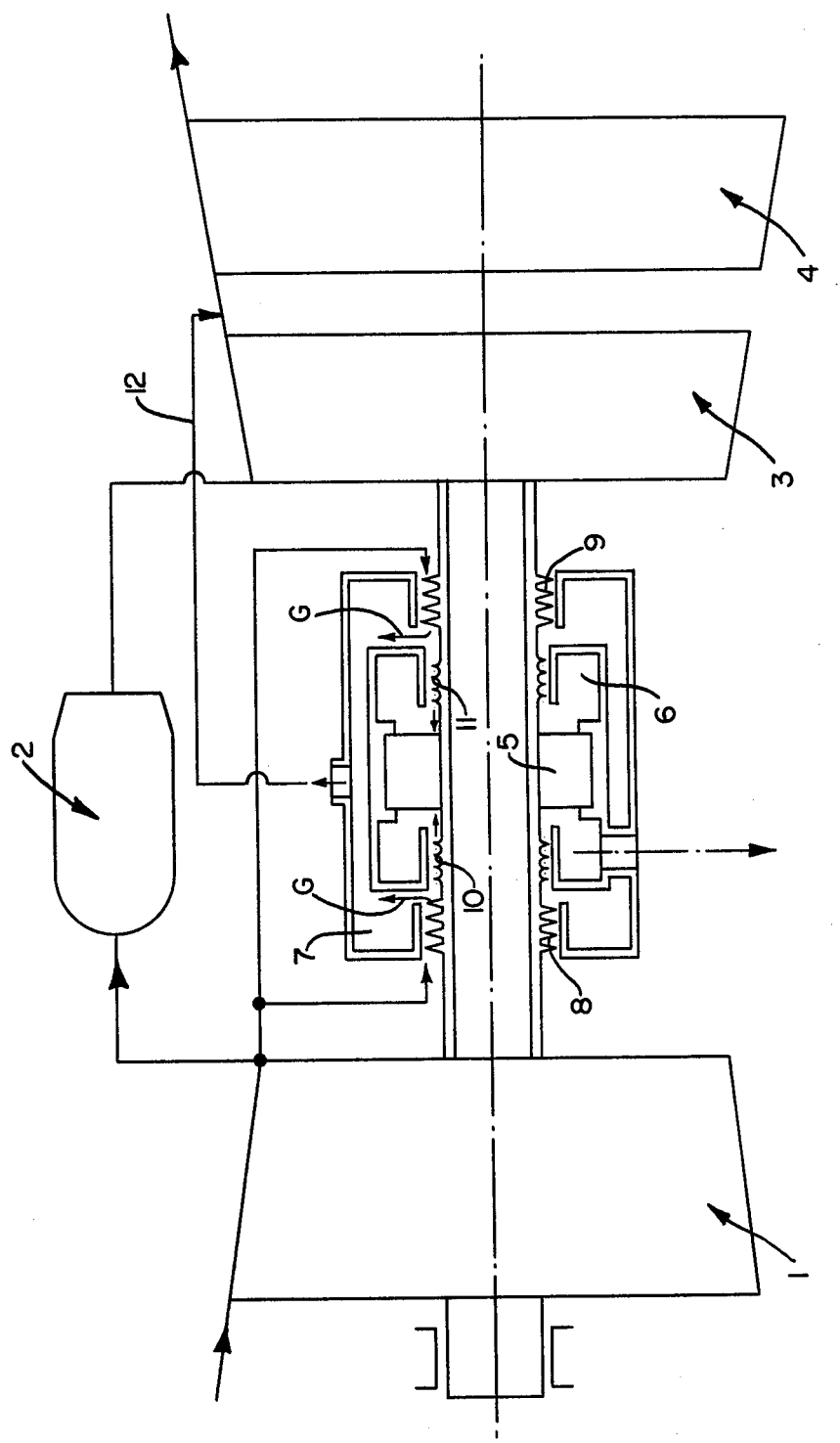

SEAL SYSTEM FOR A GAS TURBINE ENGINE OR THE LIKE

BACKGROUND AND SUMMARY OF THE INVENTION

This invention relates to a seal system for the bearing chamber of a turbomachine. Particularly preferred embodiments related to a seal system for a gas turbine engine, featuring a single-stage compressor or a multi-stage compressor with relatively great differences in the pressure ratios of the individual stages, whereby the compressors are designed as axial and/or radial compressors and sealing of the bearing chamber against the turbomachine shaft or another rotating component fixed to that shaft is provided by contact-free seals, e.g., labyrinth seals, by means of sealing air, sealing steam or sealing gas.

Exemplary prior art refrences are U.S. Pat. No. 3,537,713, which includes so-called "labyrinth Seals" and U.S. Pat. No. 2,640,319, which shows bearings for a turbomachine shaft of conventional construction in FIGS. 1 and 1B thereof, which bearings are of the type contemplated in conjunction with the present invention.

More particularly, this invention relates to the conceptual design of contact-free seals operating with sealing air or sealing steam or sealing gas (labyrinth seals), in cases where only confined space is available for installation and/or in single-stage turbomachines.

Sealing systems of this type are commonly designed so that air or steam or gas is introduced into the bearing chamber via a restrictor body designed in the form of a labyrinth, thereby avoiding the leakage of oil. In such systems, the sealing medium (air or steam or gas) which unavoidably enters the oil compartment automatically causes heat to be transported into it because of the temperature and material characteristics of the sealing medium itself. Such heat may result in thermal stressing of the bearing and associated corresponding heating-up of the lubricating oil. Furthermore, the sealing medium entering the bearing chamber may lead to foaming of the lubricating oil and to all the consequent familiar problems associated with this phenomena.

Finally, the problems connected with heat dissipation from the bearing chamber and the recooling of the lubricating oil cannot be neglected.

In some configurations of thermal turbomachines, it is required that a bearing chamber has to be sealed against the highest pressure encountered in the entire machine system.

In the case of a multi-stage machine, where there are no space restrictions in designing the sealing for bearing chambers, the problems confronted are not so serious. In this case, however, it is necessary to provide sealing medium from a middle stage of the machine with a temperature and pressure which are both lower than the highest temperature and the highest pressure in the machine system. The leakage flow led off through a vent line is either carried overboard or, as the case may be, re-fed to the machine cycle at a suitable point.

In the case of a single-stage machine (e.g., radial compressor), however, no sealing air can be provided, the temperature and pressure of which are lower at the tapping point than at the machine end. Bearing sealing can therefore only be accomplished by means of a single labyrinth.

The same usually applies to multi-stage machines with great differences in the pressure head of the individual stages (e.g., axial-radial-compressors).

Bearing sealing has also to be accomplished by means of a single labyrinth in cases where, for instance, insufficient space can be provided for the use of a triple labyrinth.

This means, however, that in the examples mentioned air (or gas or steam) at the highest pressure and at the highest temperature encountered in the system has to be used as the sealing medium, this resulting in all the known adverse consequences for the bearing and the lubricating system (heating-up of the oil compartment, oil foaming, oil defoaming, oil-air separation, oil cooling, bearing temperatures, overall temperature level in the lubricating system, oil quantities).

As the pressure ratio across the labyrinth is automatically high, correspondingly great quantities of sealing medium enter the oil compartment.

An object of this invention is to solve the above-noted problems and to devise a contact-free seal system which, under the above-mentioned conditions, guarantees satisfactory sealing, especially in cases where only confined space is available for installation, with minimum thermal stressing of the bearings and the lubricating system.

According to one aspect of the present invention it is proposed to design the bearing chamber sealing system as a dual labyrinth system.

The pressure upstream of the first labyrinth, normally the highest pressure in the entire system, is reduced by this first labyrinth. After passing the first labyrinth, most of the sealing air (or steam or gas) is bled from the bearing area and re-fed to the machine cycle at a suitable point; the pressure of the remaining smaller portion of sealing medium is further reduced in a second labyrinth, this portion then entering the bearing chamber and sealing it thereby.

By means of a vent line extending into the area between the first and second labyrinth, the pressure obtaining at this point can be adjusted so that it is only slightly higher than the pressure in the oil compartment of the bearing. The pressure ratio is therefore low across the second labyrinth and consequently the sealing air (gas or steam) flow into the oil compartment is correspondingly small.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

The single drawing FIGURE is a schematic longitudinal center sectional view of a gas-turbine engine including a sealing system in accordance with a preferred embodiment of the present invention.

DETAILED DESCRIPTION OF THE DRAWINGS

The gas turbine engine shown in schematic form comprises in the following order: compressor 1, combustion chamber 2 and gas generator turbine 3 which form the gas generator, and a mechanically independent free power turbine 4 downstream of gas generator turbine 3.

The scope and nature of the invention primarily involves the bearing chamber seal system being designed as a dual labyrinth system as described in more detail below. Since many details of the gas turbine engine would be readily apparent to one skilled in the art, given the state of the art, the same are excluded in this description and in the drawings in order not to obscure the present invention.

In the drawing, a first chamber (bearing chamber) 6 directly associated with the bearing 5 has a second chamber 7 surrounding it. Labyrinth seals 8, 9 reduce the high pressure of the sealing gas outside of the second chamber 7 as it passes through them. Most of the gas, before entering the labyrinth seals 10, 11 associated with the first chamber 6, is led off from the second chamber 7 and is fed via a vent line 12 to the engine working cycle upstream of power turbine 4. The remaining smaller portion of the sealing medium is further reduced in pressure as it enters into chamber 6 across the labyrinth seals 10, 11.

A practical preferred embodiment of this invention provides that only about ⅓ of the total tapped sealing gas flow is required and utilized for the sealing of the first chamber (bearing chamber).

In particularly preferred embodiments, the cross-sectional areas for that portion of the sealing gas flow entering the second chamber 7 (arrows G) is selected so that, in conjunction with the venting system mentioned, the pressure obtaining in the second chamber 7 is only slightly higher than in the first chamber 6.

The present invention could also be applied, in addition to the illustrated single-stage axial compressor, to multi-stage compressors with relatively great differences in the pressure ratios of the individual stages, whereby the compressors may be of the axial and/or radial type. In such embodiments, the sealing medium would be a portion of the output of one of these compressor stages.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Sealing apparatus for a gas turbine engine or the like of the type having compressor means, said compressor means including a turbomachine shaft and bearing means in a bearing chamber for said turbomachine shaft, said sealing apparatus comprising:
    a dual labyrinth system having first and second labyrinth seal means interposed between a supply of high pressure sealing medium and said bearing chamber,
    said labyrinth seal means including contact-free seal portions which permit passage of said sealing medium while reducing the pressure thereof, whereby the pressure of said sealing medium is sequentially reduced as it passes through said first and second labyrinth seal means into said bearing chamber,
    wherein a second chamber is provided which surrounds said bearing chamber, wherein said first labyrinth seal means are disposed between said supply of high pressure sealing medium and said second chamber, and wherein said second labyrinth seal means are disposed between said second chamber and said bearing chamber.

2. Apparatus according to claim 1, wherein vent line means are provided for conducting most of the sealing medium passing into said second chamber to a suitable point in the working cycle of the gas turbine engine, and wherein the remaining smaller portion of the sealing medium is supplied to said bearing chamber under further reduction of pressure via said second labyrinth seal means.

3. Apparatus according to claim 2, wherein said labyrinth seal means and said vent lines are configured and dimensioned to assure that the pressure of the sealing medium in said second chamber is only slightly higher than the pressure of the sealing medium in said bearing chamber.

4. Apparatus according to claim 2, wherein the gas turbine engine comprises serially arranged compressor means, combustion chamber means, gas generator means including a gas generator turbine, and a mechanically independent free power turbine driven by gases from said gas generator turbine, and wherein said turbomachine shaft interconnects said compressor means and said gas generator turbine.

5. Apparatus according to claim 4, wherein said vent line leads from said second chamber to a position immediately upstream of said free power turbine, said sealing medium being air compressed by said compressor means.

6. Apparatus according to claim 4, wherein further venting means are provided, separate from said vent line, for venting said bearing chamber.

7. Apparatus according to claim 2, wherein said smaller portion is approximately one third of the total supply of sealing medium to said second chamber.

8. Apparatus according to claim 1, wherein the gas turbine engine comprises serially arranged compressor means, combustion chamber means, gas generator means including a gas generator turbine, and a mechanically independent free power turbine driven by gases from said gas generator turbine, and wherein said turbomachine shaft interconnects said compressor means and said gas generator turbine.

9. Apparatus according to claim 1, wherein said compressor means is a single stage compressor, said sealing medium being compressed air from said compressor.

10. Apparatus according to claim 1, wherein said compressor means is a multi-stage compressor, said sealing medium being compressed air from one of said compressor stages.

* * * * *